US008613035B2

United States Patent
Lee et al.

(10) Patent No.: US 8,613,035 B2
(45) Date of Patent: Dec. 17, 2013

(54) PACKAGE IDENTIFICATION METHOD AND LOCATION RESOLUTION METHOD

(75) Inventors: Heekyung Lee, Daejon (KR); JungWon Kang, Seoul (KR); Jae-Gon Kim, Daejon (KR); Jinwoo Hong, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1088 days.

(21) Appl. No.: 11/658,278

(22) PCT Filed: Dec. 17, 2004

(86) PCT No.: PCT/KR2004/003348
§ 371 (c)(1),
(2), (4) Date: Jan. 23, 2007

(87) PCT Pub. No.: WO2006/009342
PCT Pub. Date: Jan. 26, 2006

(65) Prior Publication Data
US 2008/0295142 A1 Nov. 27, 2008

Related U.S. Application Data

(60) Provisional application No. 60/590,442, filed on Jul. 23, 2004.

(51) Int. Cl.
*H04N 7/16* (2011.01)
*G06F 15/16* (2006.01)

(52) U.S. Cl.
USPC ............ 725/135; 725/142; 709/218; 709/219

(58) Field of Classification Search
None
See application file for complete search history.

(56) References Cited

U.S. PATENT DOCUMENTS

2002/0194188 A1 12/2002 Ostermann et al.

FOREIGN PATENT DOCUMENTS

| EP | 1 244 309 A1 | 9/2002 |
|----|----|----|
| EP | 1 267 282 A1 | 12/2002 |
| EP | 1 271 350 A1 | 1/2003 |
| EP | 1475702 | 11/2004 |
| KR | 1020020046949 A | 6/2002 |
| KR | 1020047708101 | 7/2004 |
| KR | 1020040090836 A | 10/2004 |
| WO | WO03/047256 | 6/2003 |
| WO | WO03/063492 | 7/2003 |
| WO | WO03/063493 | 7/2003 |
| WO | 03/077558 A2 | 9/2003 |
| WO | 2004/008764 A1 | 1/2004 |
| WO | 2004/036870 A2 | 4/2004 |

OTHER PUBLICATIONS

TV_Anytime, Specification Series: S-2 on System Description; SP002V13, Version 1.3, Feb. 2003.*

(Continued)

*Primary Examiner* — Jason J Chung
*Assistant Examiner* — James R Marandi
(74) *Attorney, Agent, or Firm* — Ladas & Parry LLP

(57) ABSTRACT

Provided are a package identification method and a location resolution method, more particularly, a package identification method for identifying a dependent package linked with a main AV and independent packages not linked with the main AV, and a location resolution method. Both when the package is dependent and linked with the main AV and when the package is independent and not linked with the main AV, a CRID is used as an identifier for the package. The present invention supports TVA-2 service scenarios by suggesting improved package identification and a location resolution mechanism.

11 Claims, 1 Drawing Sheet

(56) References Cited

OTHER PUBLICATIONS

The TV-Anytime Forum: "The TV-Anytime Forum Requirements Series: R-1 (Phase 2), On: Business Models (informative); document RQ001v20", (Aug. 15, 2003), XP002558768,pp. 1-24.

TV-Anytime: "Specification Series: S-3-Metadata-SP003v1.1", (Aug. 17, 2001), XP002205700, pp. 1-66.

The TV-Anytime Forum: Specification Series: S-4, Content Referencing (Normative), (Apr. 14, 2001), XP002220957, pp. 1-46.

Jean-Pierre Evain, et al; "TV-Anytime Phase 1", (Jul. 1, 2003), XP002543034, XP002543034, pp. 1-12.

Draft ETSI TS 102 822-2 v1.2.1 (Jul. 2004), Broadcast and On-line Services: Search, select, and rightful use of content on personal storage systems (TV-Anytime Phase 1); Part 2: System description European Broadcasting Union Union Européenne de Radio-Télévision EBU.UER; XP014020999, pp. 1-76.

European Search Report: EP 04 80 8479.

The TV-Anytime Forum; "Specification Series: S-2 On: System Description (Informative with Normative Appendix B)", Document SP002v13, Feb. 14, 2003; 101 pages.

Heekyung Lee, et al; "AN630: Package Identification Issues", Proposal for the 29th meeting of the TV-Anytime Forum, Geneva, Jul. 2004, 7 pages.

\* cited by examiner

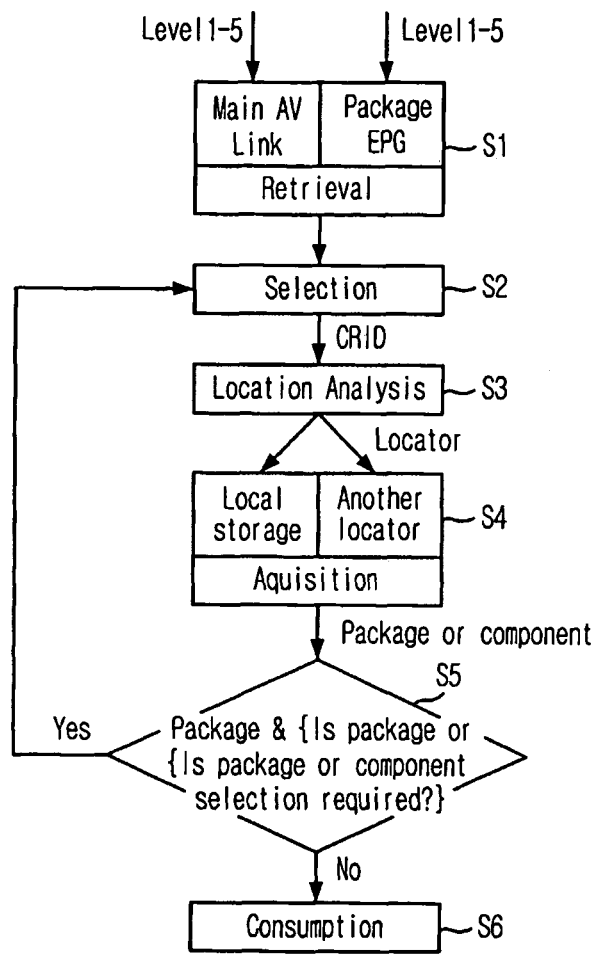

PACKAGE IDENTIFICATION METHOD AND LOCATION RESOLUTION METHOD

CROSS-RELATED APPLICATIONS

The present application claims priority to U.S. Provisional Patent Application No. 60/590,442 filed on Jul. 23, 2004 and also claims priority to the corresponding PCT completion application number PCT/KR2004/003348 filed on Dec. 17, 2006, the entirety of which are hereby incorporated by reference.

TECHNICAL FIELD

The present invention relates to a package identification and location resolution method; and, more particularly, to a method for identifying and resolving the location of a dependent package linked with a main audio/video (AV) and an independent package not linked with the main AV.

BACKGROUND ART

As broadcasting is digitalized, broadcasting environments are changing rapidly from a conventional uni-directional broadcasting reception into more complicated forms such as multimedia, multichannel, and subscription through diverse receiving terminals by linking broadcasting networks with communication networks. An increasing number of viewers demand to directly participate in a broadcasting service out of a conventional passive attitude of receiving and watching a broadcasting program by selecting one among a limited number of channels, or to receive and watch a program they want at a desired time.

The change can be summarized that the broadcasting environments are developing into more complicated, diversified and personalized forms. Customized broadcasting makes it possible for viewers to consume desired broadcasting contents according to their preferences in diverse kinds of terminals more conveniently and efficiently in the complicated and diverse broadcasting environments. In short, the customized broadcasting provides customized broadcasting contents suitable for a usage environment including user preference, terminal performance, network characteristics, and natural environment such as time, place and mood of a user.

Standards for customized broadcasting are divided into a Phase 1 (TVA-1) and a Phase 2 (TVA-2) in the respect of an assumed system environment and main functions to be provided. The TVA-1 makes it possible to provide application services such as retrieval, selection, acquisition and consumption of AV contents based on a personal digital recorder (PDR) in an environment where a main broadcasting program is transmitted on a uni-directional broadcasting channel and additional metadata can be obtained through a bi-directional network. The TVA-2 extends a consumption environment of the TVA-1 where a uni-directional broadcasting channel and a bi-directional network are assumed, shares contents among diverse terminals in a home network environment, provides services such as a targeting that provides contents suitable for diverse user environments, and accommodates not only TVA-1 AV contents but also diverse forms of contents as well.

A package is defined as a set of contents components. Herein, the components, which is a predetermined combination (a set of all or a subset), provide a consumer with experience and they are intended to be consumed altogether according to requirements for a business model, i.e., RQ001v20. Packages have been simply recognized to be dependent on AV contents. However, they need to be regarded at the same level as the AV contents to provide broader customized broadcasting. In short, packages can be not only dependent packages linked with a main AV but also independent packages not linked with the main AV. Therefore, required is a new method for identifying a package and resolving the location of the package.

DISCLOSURE

Technical Problem

It is, therefore, an object of the present invention, which is devised to meet the demand, to provide a refined package identification mechanism using a content reference identifier (CRID) and a location resolution method.

Technical Solution

In accordance with one aspect of the present invention, there is provided a method for identifying a package, which includes the steps of: a) using a Content Reference Identifier (CRID) as an identifier for the package, when the package is a dependent package linked with a main audio/video (AV), and b) using a CRID as an identifier for the package, even when the package is an independent package not linked with a main AV.

In accordance with another aspect of the present invention, there is provided a method for resolving a location of an independent package not linked with a main AV, which includes the steps of: a) receiving package information metadata using a CRID as a package identifier; b) searching packages displayed to be available on a user terminal based on the package information metadata; c) selecting a desired package among searched packages; and d) acquiring package metadata on the selected package by using the CRID of the selected package.

In accordance with another aspect of the present invention, there is provided a method for resolving a location of a package in a plurality of dependent package groups linked with a main AV, which includes the steps of: a) selecting any one package group among the package groups; b) acquiring a package group by using an identifier of the selected package group, the identifier using a CRID; and c) selecting and acquiring one package in the acquired package group. Herein, metadata of the package groups are not provided together with metadata of the main AV.

In accordance with another aspect of the present invention, there is provided a method for resolving a location of a package in a plurality of dependent package groups linked with a main AV, which includes the steps of: a) selecting any one package group among the package groups; b) acquiring a package group by using an identifier of the selected package group, the identifier using a CRID; and c) selecting and acquiring one package in the acquired package group. Herein, metadata of the package groups are not provided together with metadata of the main AV.

Advantageous Effects

The present invention has an effect of supporting TVA-2 service scenarios by suggesting refined package identification and location resolution mechanisms with respect to both dependent package linked with a main audio/video (AV) and independent package not linked with the main AV described by using TVA-1 schema.

DESCRIPTION OF DRAWINGS

The above and other objects and features of the present invention will become apparent from the following descrip- FIG. 1 is a flowchart describing a package consuming process under diverse conditions.

BEST MODE FOR THE INVENTION

Other objects and aspects of the invention will become apparent from the following description of the embodiments with reference to the accompanying drawings and accordingly those of ordinary skill in the art of the present invention can easily implement the technological concept of the present invention.

Hereinafter, preferred embodiments of the present invention will be set forth in detail with reference to the accompanying drawings.

Packages can be categorized into dependent packages linked with a main audio/video (AV) or independent packages not linked with the main AV.

The dependent packages linked with the main AV can include supplementary materials, e.g., selectable resource instance of the main AV such as multiparallel streams from another view or web links related to the main AV, images, and games. When a package provides a useful scenario in consumption of the main AV, the package is regarded as a material in connection with the broadcasting main AV. Thus, the package is referred to by a 'RelatedMaterialType' element included in program information (ProgramInformation) of the main AV. However, since any URI that the 'RelatedMaterialType' element uses is unique only in the same metadata document but the same any URI may exist when documents are different, it does not provide an absolute packet identification function.

Therefore, the present invention uses Content Reference Identifier (CRID) as an identifier to identify a dependent package linked with a main AV due to a necessity for a unique identifier for package and a Group of Package (GOP).

Table 1 shows the main AV referring to a package combined with educational components. It presents an example of a package linked with a main AV and shows that the main AV described by using the 'ProgramInformation' element of the TVA-1 is linked with a package having an 'crid://www.imbc.com/educational_package1' identifier. Detailed description metadata on the package having the 'crid://www.imbc.com/educational_package1' identifier are described by using a 'Container' which is a low-rank element of the 'PackageTable' element defined in the TVA-2.

TABLE 1

```
<TVA2Main xmlns="urn:tva:metadata:phase2:2004" xmlns:tva="urn:tva:metadata:2004"
xmlns:mpeg7="urn:mpeg:mpeg7:schema:2001" xmlns:dia="urn:mpeg:mpeg21:2003:01-DIA-NS"
xmlns:did="urn:tva:metadata:DID2004" xmlns:xsi="http://www.w3.org/2001/XMLSchema-Instance"
xsi:schemaLocation="urn:tva:metadata:phase2:2004   ./tva2_metadata_v1_2.xsd">
    <ProgramDescription>
        <tva:ProgramInformationTable>
            <tva:ProgramInformation programId="crid://www.imbc.com/newnonstop103040700704">
                <tva:BasicDescription>
                    <tva:Title>Sitcom Nonstop 706 - Three Beauties</tva:Title>
                    <tva:MediaTitle>
                        <mpeg7:TitleImage>
                            <mpeg7:MediaUrl>file://C:/metadata/picture/Program/ImagesN/
                       newnonstop.bmp</mpeg7:MediaUri>
                    </mpeg7:TitleImage>
                    </tva:MediaTitle>
                    <tva:Synopsis>Three friends go to café alternately for beautiful prof Kim Hyojin</tva:Synopsis>
                    <tva:Keyword>Minyong Choi; Taewoo Jeong: Haha: Hansun Cho: Dabin Jeong: Jean Lee: Dana:
                        Hyebin Sitcom Nonstop 3</tva:Keyword>
                    <tva:Genre href="urn:tva:metadata:cs:ContentCS:2002:3.4.2.1">
                        <tva:Name xml:lang="kr">Drama</tva:Name>
                    </tva:Genre>
                    <tva:RelatedMaterial>
                        <tva:MediaLocator>
                            <mpeg7:MediaUri>crid://www.imbc.com/educatlonal_package1</mpeg7:MediaUri>
                        </tva:MediaLocator>
                    </tva:RelatedMaterial>
                </tva:BasicDescription>
                <tva:OtherIdentifier type="URI" encoding="text">Seoul Korea</tva:OtherIdentifier>
                <tva:MemberOf crid="crid://www.imbc.com/newnonstop"/>
            </tva:ProgramInformation>
        </tva:ProgramInformationTable>
        <PackageTable>
            <Container crid="crid://www.imbc.com/educational_package1">
                <did:item>
                    <did:Component>
                        <did:Condition require="Audio_WAV"/>
                        <did:Resource mimeType="audio/wav" crid="crid://www.imbc.com/EnglishEducation/First-
                            Phrase"
                                              imi="imi:1 imi:2"/>
                    </did:Component>
                </did:Item>
            </Container>
        </PackageTable>
    </ProgramDescription>
</TVA2Main>
```

When a plurality of packages are linked with the main AV and become available and the packages are identified independently by the CRID, the packages can be identified. Table 2 shows an example of a program having a program identifier 'crid://www.imbc.com/newsnonstop103040700704' and two related packages. It shows that the main AV described by using the 'ProgramInformation' element of the TVA-1 includes a package having an identifier 'crid://www.imbc.com/educational_package1' and an identifier 'crid://www.imbc.com/educational_package2' as supplementary data by using a low-rank element 'RelatedMaterial.'

TABLE 2

```
<TVAMain xmlns="urn:tva:metadata:2002">
    <ProgramDescription>
        <ProgramInformationTable>
            <ProgramInformation programId="crid://www.imbc.com
            newnonstop103040700704">
                <BasicDescription>
                    <Title>Sitcom Nonstop 3 706 - Three Beauties</Title>
                    <Synopsis>Three friends go to café for beautiful Prof Kim Hyojin</Synopsis>
                    <Keyword>Taewoo Jeong;Haha;Hansun Cho;Jean Lee;Dana;Hyebin Sitcom Nonstop
                    3
                      </Keyword>
                    <Genre href="urn:tva:metadata:cs:ContentCS:2002:3.4.2.1">
                        <Name xml:lang="kr">drama</Name>
                    </Genre>
                    <ParentalGuidance>
                        <mpeg7:ParentalRating
                            href="urn:tva:metadata:cs:IntendedAudienceCS:2002:4.1">
                            <mpeg7:Name xml:lang="en">GENERAL AUDIENCE</mpeg7:Name>
                        <mpeg7:ParentalRating>
                     </ParentalGuidance>
                    <Language type="original" supplemental="false">ko</Language>
                    <CaptionLanguage closed="true" supplemental="false">
                            ko</CaptionLanguage>
                    <SignLanguage>ko</SignLanguage>
                    <RelatedMaterial>
                        <MediaLocator>
                                <mpeg7:MediaUri>crid://www.imbc.com/educational_package1
                                </mpeg7:MediaUri>
                        </MediaLocator>
                    </RelatedMaterial>
                    <RelatedMaterial>
                        <MediaLocator>
                                <mpeg7:MediaUri>crid://www.imbc.com/educational_package2
                                </mpeg7:MediaUri>
                        </MediaLocator>
                    </RelatedMaterial>
                </BasicDescription>
                <MemberOf crid="crid://www.imbc.com/newnonstop"/>
            </ProgramInformation>
        </ProgramInformationTable>
        <PackageInformationTable>
            <Container crid="crid://www.imbc.com/educational_package1">
                <Item>
                    <Component>
                        <Condition require="Audio_WAV"/>
                            <Resource mimeType="audio/wav"
                                crid="crid://www.imbc.com/EnglishEducation/
                                FirstPhrase"imi="imi:1 imi:2"/>
                    </Component>
                </Item>
            </Container>
            <Container crid="crid://www.imbc.com/educational_package2">
                <Item>
                    <Component>
                        <Condition require="Audio_MP3"/>
                            <Resource mimeType="audio/mp3"
                                crid="crid://www.imbc.com/EnglishEducation/
                                FirstPhrase"imi="imi:3"/>
                    </Component>
                </Item>
            </Container>
        </PackageInforamtionTable>
    </ProgramDescription>
</TVAMain>
```

Meanwhile, independent packages not linked with the main AV, e.g., a Linage game and a city tour guide package, use a CRID as a package identifier due to necessity for a unique identifier for package update and GOP.

Table 3 shows an independent package having educational components. This is an example of a package not linked with a main AV. It shows attractive metadata for a package composed of a package identifier and a package title provided to a user by using the 'PackageInformation' element of the TVA-2. Detailed description metadata for a package having an identifier 'crid://www.imbc.com/FrenchLearning_package' are described by using a low-rank element 'Container,' which is a low-rank element of the 'PackageTable' element, which is defined in the TVA-2.

package. At steps S3 and S4, the selected components are acquired by a location resolution mechanism extended from the TVA-1 using component CRID and, at steps S5 and S6, consumed by the user. The selection and acquisition are carried out once.

Herein, the location resolution mechanism extended from the TVA-1 is acquired by extending the doctrine resolution mechanism of the TVA-1. Whereas the location resolution mechanism of the TVA-1 is formed of a location analysis process and an acquisition process using CRID of selected contents, the location resolution mechanism extended from the TVA-1 is formed in the same method as the TVA-1 location resolution mechanism but with a difference only in the subject, which is a package group, package or component.

TABLE 3

```
<TVA2Main xmlns="urn:tva:metadata:phase2:2004" xmlns:tva="urn:tva:metadata:2004"
xmlns:mpeg7="urn:mpeg:mpeg7:schema:2001" xmlns:dia="urn:mpeg:mpeg21:2003:01-DIA-NS"
xmlns:did="urn:tva:metadata:DID2004" xmlns:xsi="http://www.w3.org/2001/XMLSchema-instance"
xsi:schemaLocation="urn:tva:metadata:phase2:2004  ./tva2_metadata_v1_2.xsd">
    <ProgramDescription>
        <PackageInformationTable>
            <PackageInformation>
                <PackageID>crid://www.imbc.com/SpanishLearning_package</PackageID>
                <BasicDescription>
                    <tva:Title>Learning Package for Spanish</tva:Title>
                </BasicDescription>
            </PackageInformation>
            <PackageInformation>
                <PackageID>crid://www.imbc.com/FrenchLearning_package</PackageID>
                <BasicDescription>
                    <tva:Title>Learning Package for French</tva:Title>
                </BasicDescription>
            </PackageInformation>
        </PackageInformationTable>
        <PackageTable>
            <Container crid="crid://www.imbc.oom/SpanishLearning_package">
                <did:Item>
                    <did:Component>
                        <did:Conditionrequire="Audio_WAV"/>
                        <did:Resource mimeType="audio/wav" crid="crid://www.imbc.com/SpanishLearning"
                            imi="imi:1 imi:2"/>
                    </did:Component>
                </did:Item>
            </Container>
            <Container crid="crid://www.imbc.com/FrenchLearning_package">
                <did:Item>
                    <did:Component>
                        <did:Condition require="Audio_MP3"/>
                        <did:Resource mimeType="audio/mp3" crid="crid://www.imbc.com/FrenchLearning" imi="imi:1"/>
                    </did:Component>
                </did:Item>
            </Container>
        </PackageTable>
    </ProgramDescription>
</TVA2Main>
```

Hereinafter, a method for consuming a package through a location resolution mechanism based on the above-described package identification method will be described.

Table 4 summarizes a method of consuming subordinate packages linked with the main AV under diverse conditions, and FIG. 1 is a flowchart for consuming the packages under diverse conditions.

Both levels 1 and 2 show packages linked with the main AV and package metadata provided with the metadata of the main AV.

In case of the level 1, one package is linked with the main AV, which is shown in Table 1 and package metadata are provided with the metadata of the main AV. At step S1, when one package linked with the main AV is searched and, at step S2, components that fit to a usage environment are selected by a user among a plurality of components that belong to the package.

In case of the level 2, a plurality of packages or one package group (GOP) is linked with the main TV, and metadata for the packages or the package group are provided with the metadata of the main AV. At the step S1, a plurality of packages or one package group linked with the main AV is searched and, at the step S2, one package is selected by the user and components that fit to the user environment are selected out of the components that belong to the selected package. The package and the component are selected in the same selection step. At the steps S3 and S4, the selected components are acquired through the location resolution mechanism extended from the TVA-1 by using the component CRID and, at the steps S5 and S6, the acquired components are consumed by the user. The selection and the acquisition are carried out once.

In levels 3 to 5, one or more package groups (GOP) are linked with the main AV and package metadata are not provided with the metadata of the main AV.

In the level 3, a plurality of packages are linked with the main AV and the package metadata are not provided with the metadata of the main AV. At the step S1, a plurality of packages linked with the main AV are searched and, at the step S2 to S4, one package is selected by the user and acquired through the location resolution mechanism extended from the TVA-1 by using a package CRID. In other words, the package acquisition using the package identifier is carried out by figuring out an actual locator of a package through location analysis from the identifier of the selected package and acquiring package metadata in the location. Since a component needs to be selected at the step S5, a component pre-stored in a local storage is consumed by going through the location resolution process of the steps S2 to S4 at the steps S5 and S6. The selection and the acquisition are performed twice.

In the level 4, one or more package groups (GOP) are linked with the main AV, and metadata for the one or more package groups are not provided with the metadata of the main AV. At the step S1, one or more package groups linked with the main AV are searched and, at the steps S2 to S4, one package group is selected by the user and acquired through the location resolution mechanism extended from the TVA-1. Since the package selection is necessary at the step S5, the package is acquired by going through the location resolution process again at the steps S2 to S4. Since a component selection is necessary at the step S5, the location resolution process is carried out again at the steps S2 to S4 and a component pre-stored in the local storage is consumed at the steps S5 and S6. The selection and acquisition is carried out three times.

In the level 5, a plurality of packages or package groups are linked with the main AV, and package metadata are not provided with the metadata of the main AV. After one package is acquired through the location resolution mechanism of the level 3 or 4, and then components that fit to the user environment selected by the user among the components of the package. The selected components are acquired by the location resolution mechanism extended from the TVA-1 and consumed by the user. The selection and the acquisition are carried or twice or three times according to the kind of package.

CRID of the acquisition step of Table 4 can indicate a component or a package. If the CRID indicates a component, the package is provided together with the metadata of the main AV and the CRIDs of some components among the components of the package will become the targets of acquisition.

On the contrary, if the CRID indicates a package, it means that the package metadata are not provided with the metadata of the main AV while the package is linked with the main AV or that the package is independent from the main AV. Herein, a package can be acquired from the CRID by performing the location resolution mechanism once, and it is possible to acquire components by repeating the location resolution mechanism.

TABLE 4

|  | Search | Selection | Acquistion | Consumption | Reference |
|---|---|---|---|---|---|
| Level 1 | Package | Component | Component | Consumption of Component | Package is linked with main AV. Package metadata is provided with metadata of main AV. |
| Level 2 | Package (multiple packages/ one package group) | Package -> component | Component | Consumption of Component | Packages or one package group are/is linked with main AV. Metadata for packages or one package group are provided with metadata of main AV. |
| Level 3 | Package (multiple packages) | Package | Package (Package ID -> Package locator) | Consumption of Pre-stored component | Multiple packages are linked with main AV. Package metadata are not provided with metadata of main AV. |
| Level 4 | Packages (one/more package groups) | Packages (one package group) | Packages (GOP ID -> Package ID -> Package locator) | Consumption of Pre-stored component | One or more package group are linked with main AV. Metadata for one or more package groups are not provided with metadata of main AV. |
| Level 5 | Package | Package | Package Component | Consumption of component | Level 3/4 Level 1 |

A process of consuming an independent package not linked with the main AV, which is shown in Table 3, will be described as follows with reference to FIG. 1 (Level 6).

First, package information metadata are delivered to a user terminal through a unidirectional broadcast channel or a bidirectional networks based on SP006. The package information metadata are attractive metadata on packages such as the package ID, package title, and package synopsis.

When the package information metadata are delivered to the user terminal, the presence of an available package is notified to the user through a user interface such as electronic program guide. Then, at the steps S1 and S2, the user searches and selects a package he wants to consume.

Subsequently, at the steps S3 and S4, the user acquires package metadata on the package selected based on the location resolution mechanism extended from the TVA-1 by using the package CRID. At the steps S5 and S2, components that satisfy the conditions for a given user environment based on the acquired package metadata are selected automatically manually or by an agent. At the steps S3 and S6, the selected components are acquired and consumed based on the location resolution mechanism extended from the TVA-1 by using the package CRID.

The aforementioned package identification and location resolution mechanism supports main AV-dependent or independent packages with TVA-2 service scenarios very well. The examples of the scenarios include 'Non-linear multi-parallel stream A/V service, Service Scenario 6.2.4' using an independent package and 'Broadcast movie trailer' using a package linked with a main AV.

Meanwhile, the location resolution mechanism extended from the TVA-1 needs to identify when a CRID indicates a package or a component. To identify this, a flag called 'package/component identifier' is added to a message format of a location resolution table (LRT) of the TVA-1, which is shown in Table 5.

Also, when a package searched out based on keyword-based search is linked with the main AV, the user is in need of a method for identifying whether the package is linked with the main AV. To identify whether the package is linked with the main AV, a flag called 'related to main AV', which indicates whether the package is linked with the main AV, is added to a message format of the location resolution table (LRT) of the TVA-1, which is shown in Table 4.

TABLE 5

| CRID Field | Message Description |
|---|---|
| | Each message shall at least include: |
| Status | "CRID is resolved" (resolution list follows). "discard CRID" (E.g., CRID is valid no longer). "resolve after date <xxx>" (keep CRID, try later) If the status is "CRID is resolved": |
| Acquisition directive | "all" (all items of the following list must be acquired.) "Any" (any item from the following list may be acquired as they are alternative locations for the same content) |
| A list of CRIDs a list of locator(s) | CRIDs will conform to the syntax given in section Locators will conform to the syntax given in section Optionally, each locator can have an associated instance metadata identifier |
| Resolution complete | Is list complete? Yes (CRID is completely resolved) (e.g., this is the last episode of the series) No (CRID might resolve into more items at a later date) |
| Date of Re-resolution | Date after which the PDR should attempt to re-resolve the CRID. This field is only meaningful when the Resolution Complete flag is set to "no." This date shall be unambiguous with respect to time zone |
| Package/ Component identifier | Is this a package? Yes (CRID is completely resolved to a package) No. (CRID resolves into components) |
| Link with main AV | Is the package related to main AV? Yes (The main AV is tried to be found) No (None) |

Meanwhile, in connection with a targeting mechanism of box types of packages, e.g., MHP, ACAP, ARIB and the like, or middleware-based packages, the targeting mechanism for a box type of packages or a middleware-based package is not needed before the acquisition of a package. However, a targeting mechanism for a box-type or middleware-based item or component that extends a usage environment description (UED) descriptor in the inside of the package is needed. This is because of the two cases.

First, when a package is delivered through a broadcasting channel, a data broadcasting standard such as the MHP and the ACAP is fixed with respect to a region, and since the other standards, e.g., standards for the box type, except the fixed standard are not used, a broadcasting service provider already knows the target box type and middleware.

Second, when the package is delivered to a bi-directional network such as the Internet and the package includes an application program for data broadcasting, the application program should be consumed in the middleware of the data broadcasting. Herein, the package needs to identify the box type so that the user terminal can select a program according to the box type. This signifies that it needs not add a box-type descriptor to the UED.

As described above, the method of the present invention can be realized as a program and stored in a computer-readable recording medium. Also, those of ordinary skill in the art can embody the system for providing a package by using the afore-described package identification and location resolution method, and a user terminal that consumes the package.

While the present invention has been described with respect to certain preferred embodiments, it will be apparent to those skilled in the art that various changes and modifications may be made without departing from the scope of the invention as defined in the following claims.

What is claimed is:

1. A non-transitory computer-readable recording medium comprising coded instructions for carrying out a method for providing a package comprising a set of contents components to a user terminal, the instructions coded in the computer-readable recording medium comprising:
   instructions for generating package metadata for describing package;
   instructions for generating program information (PI) metadata of the main AV when the package is linked with a main AV such that the PI metadata includes a Content Reference Identifier (CRID) that identifies the package;
   instructions for generating PI metadata for describing package information in an identification (ID) and a title of the package when a package is not linked with the main AV, wherein the PI metadata includes the CRID as an identifier for the package;
   instructions for transmitting and delivering PI metadata to the user terminal;
   instructions for selecting the package corresponding to the PI metadata after a user terminal browses; and
   instructions for using the CRID of the PI metadata of the selected package as an identifier for the selected package.

2. The computer-readable recording medium as recited in claim 1, further comprising instructions for notifying the user terminal that the PI metadata was delivered to the user terminal by providing an electronic program guide at the user terminal.

3. The computer-readable recording medium as recited in claim 1, wherein the CRID of the PI metadata has a flag added to a message format of a location resolution table that indicates whether or not the package linked with the main AV.

4. A system having coded instructions stored in a non-transitory computer-readable recording medium for providing a package that comprises a set of contents components to a user terminal, the instructions stored in the system comprising:
   stored instructions for generating package metadata for describing package;
   stored instructions for generating program information (PI) metadata of the main AV when the package is linked with a main AV such that the PI metadata includes a Content Reference Identifier (CRID) that identifies the package;
   stored instructions for generating PI metadata for describing package information in an identification (ID) and a title of the package when a package is not linked with the main AV, wherein the PI metadata includes the CRID as an identifier for the package;

stored instructions for transmitting and delivering PI metadata to the user terminal;

stored instructions for selecting the package corresponding to the PI metadata after a user terminal browses; and stored instructions for using the CRID of the PI metadata of the selected package as an identifier for the selected package.

5. The system as recited in claim 4, further comprising stored instructions for notifying the user terminal that the PI metadata was delivered to the user terminal by providing a electronic program guide at the user terminal.

6. The system as recited in claim 4, wherein the CRID of the PI metadata has a flag added to a message format of a location resolution table that indicates whether or not the package is linked with the main AV.

7. A non-transitory computer-readable recording medium comprising instructions for carrying out a method for consuming a set of contents components of a package, the computer-readable recording medium comprising the steps of:

generating package metadata for describing package;

generating program information (PI) metadata of the main AV when the package is linked with a main AV such that the PI metadata includes a Content Reference Identifier (CRID) that identifies the package;

generating PI metadata for describing package information in an identification (ID) and a title of the package when a package is not linked with the main AV, wherein the PI metadata includes a Content Reference Identifier (CRID) as an identifier for the package;

transmitting and delivering PI metadata to the user terminal;

selecting the package corresponding to the PI metadata after a user terminal browses; and using the CRID of the PI metadata of the selected package as an identifier for the selected package.

8. The computer-readable recording medium as recited in claim 7, wherein the PI metadata is transmitted to the user terminal through a uni-directional broadcasting channel or a bi-directional network.

9. The computer-readable recording medium as recited in claim 7, wherein the searching step includes:

searching an available package to a user terminal from the PI metadata, wherein the available package is provided in a form of an electronic program guide.

10. The computer-readable recording medium as recited in claim 7, wherein the acquiring step includes:

resolving a locator of the selected package using the CRID of the selected package; and acquiring the package metadata using the locator.

11. The computer-readable recording medium as recited in claim 7, further comprising:

consuming a component that fits to a user environment condition based on the acquired package metadata.

* * * * *